United States Patent
Sokolov et al.

(10) Patent No.: US 7,082,597 B2
(45) Date of Patent: Jul. 25, 2006

(54) REPRESENTATION OF OBJECTS IN A JAVA PROGRAMMING ENVIRONMENT

(75) Inventors: Stepan Sokolov, Fremont, CA (US); David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 466 days.

(21) Appl. No.: 09/886,454

(22) Filed: Jun. 20, 2001

(65) Prior Publication Data

US 2002/0198698 A1 Dec. 26, 2002

(51) Int. Cl.
*G06F 9/44* (2006.01)

(52) U.S. Cl. ............................ 717/118; 717/114

(58) Field of Classification Search ................ 717/148, 717/136, 166, 100, 147, 158, 130, 153, 114–119, 717/155; 719/316, 330; 711/171, 170; 707/103 R, 707/100; 718/1, 100
See application file for complete search history.

(56) References Cited

U.S. PATENT DOCUMENTS

| | | | | |
|---|---|---|---|---|
| 5,920,720 A * | 7/1999 | Toutonghi et al. | ........... | 717/148 |
| 6,070,173 A | 5/2000 | Huber et al. | | |
| 6,088,777 A * | 7/2000 | Sorber | ........................ | 711/171 |
| 6,115,719 A * | 9/2000 | Purdy et al. | ............. | 707/103 R |
| 6,134,603 A * | 10/2000 | Jones et al. | .................. | 719/330 |
| 6,151,703 A * | 11/2000 | Crelier | ........................ | 717/136 |
| 6,154,747 A * | 11/2000 | Hunt | .......................... | 707/100 |
| 6,237,043 B1 * | 5/2001 | Brown et al. | ................ | 719/316 |
| 6,249,906 B1 * | 6/2001 | Levine et al. | ................ | 717/153 |
| 6,282,702 B1 * | 8/2001 | Ungar | ........................ | 717/148 |
| 6,330,709 B1 * | 12/2001 | Johnson et al. | ............. | 717/100 |
| 6,470,493 B1 * | 10/2002 | Smith et al. | ................. | 717/130 |
| 6,470,494 B1 * | 10/2002 | Chan et al. | ................. | 717/166 |
| 6,530,080 B1 * | 3/2003 | Fresko et al. | ................ | 717/166 |
| 6,704,746 B1 * | 3/2004 | Sokolov et al. | ......... | 707/103 R |
| 6,711,576 B1 * | 3/2004 | Tuck et al. | ................. | 707/100 |

(Continued)

FOREIGN PATENT DOCUMENTS

WO    WO 00/41079    7/2000

(Continued)

OTHER PUBLICATIONS

Radhakrishnan et al., Architectural issues in Java runtime systems, Jan. 2000, IEEE, p. 387-398.*

(Continued)

*Primary Examiner*—Wei Zhen
*Assistant Examiner*—Satish S. Rampuria
(74) *Attorney, Agent, or Firm*—Beyer Weaver & Thomas, LLP

(57) ABSTRACT

Improved techniques for representation of objects in a Java™ programming environment are disclosed. The techniques are highly suitable for representation of Java™ objects inside virtual machines, especially those that operate with limited resources (e.g., embedded systems). In accordance with one embodiment, a Java™ object representation is disclosed. As will be appreciated, the Java™ object representation provides a reference that can be used to directly access the internal class representation associated with the object. The internal class representation provides information regarding the Java™ object (e.g., object size, object type, static fields, etc.) As a result, information regarding Java™ objects can quickly be accessed. This means that the processing time conventionally needed to access information regarding Java™ objects is reduced. Thus, performance of virtual machines, especially in systems with limited computing power and/or memory, can be enhanced.

12 Claims, 5 Drawing Sheets

U.S. PATENT DOCUMENTS

| | | | |
|---|---|---|---|
| 6,711,657 B1 * | 3/2004 | Sexton et al. | 711/170 |
| 6,728,949 B1 * | 4/2004 | Bryant et al. | 717/127 |
| 6,728,955 B1 * | 4/2004 | Berry et al. | 717/158 |
| 6,732,357 B1 * | 5/2004 | Berry et al. | 717/158 |
| 6,751,789 B1 * | 6/2004 | Berry et al. | 717/130 |
| 6,823,509 B1 * | 11/2004 | Webb | 718/1 |
| 6,851,111 B1 * | 2/2005 | McGuire et al. | 717/166 |
| 6,904,594 B1 * | 6/2005 | Berry et al. | 718/100 |
| 2002/0108107 A1 * | 8/2002 | Darnell et al. | 717/153 |
| 2002/0112227 A1 * | 8/2002 | Kramskoy et al. | 717/148 |
| 2004/0015911 A1 * | 1/2004 | Hinsley et al. | 717/147 |
| 2004/0015914 A1 * | 1/2004 | Renouf | 717/148 |

FOREIGN PATENT DOCUMENTS

| | | |
|---|---|---|
| WO | WO 00/46667 | 8/2000 |
| WO | WO 00/60470 | 10/2000 |

OTHER PUBLICATIONS

Bothner, A gcc-based Java implementation, Feb. 1997, IEEE, p. 1710-1722.*

Jae-Oh Lee, Translation of GDMO/ASN.1 to Java objects for network management, IEEE, Jun. 7-11, 1998 pp. 1140-1144 vol. 2.*

Opyrchal et al., Efficient object serialization in Java, IEEE, May 31-Jun. 4, 1999 pp. 96-101.*

Jongwook et al., Alias analysis for Java with reference-set representation, IEEE, Jun. 26-29, 2001 pp. 459-466.*

Lindholm et al, "The Java™ Virtual Machine Specification", (Sep. 1996), Sun Microsystems, Inc., Chapters 1-10 (173 pp.).

"Java 2 Platform, Standard Edition, vol. 2.2,API Specification" Online, May 8, 1999, Sun Microsystems, Inc.

Ding et al., "A Precise Incremental Garbage Collection Algorithm for Java Virtual Machine," International Conference for Young Computer Scientists, ICYCS. Advances in Computer Science and Technology. Proceedings on ICYCS, vol. 1, Aug. 17, 1999, pp. 227-231.

Office Action dated Jul. 15, 2004 from U.S. Appl. No. 09/919,743.

Printezis et al. "A generational Mostly-concurrent Garbage Collector" ACM. 2000. pp. 143-154.

McDowell. "Reducing garbage in Java" ACM. 1998. pp. 84-86.

Final Office Action dated Dec. 2, 2004 from U.S. Appl. No. 09/919,743.

Notice of Allowability mailed on May 27, 2005 from U.S. Appl. No. 09/919,743.

* cited by examiner

REPRESENTATION OF OBJECTS IN A JAVA PROGRAMMING ENVIRONMENT

BACKGROUND OF THE INVENTION

The present invention relates generally to object-based high level programming environments, and more particularly, to techniques suitable for representation of objects in a Java™ programming environment.

One of the goals of high level languages is to provide a portable programming environment such that the computer programs may easily be ported to another computer platform. High level languages such as "C" provide a level of abstraction from the underlying computer architecture and their success is well evidenced from the fact that most computer applications are now written in a high level language.

Portability has been taken to new heights with the advent of the World Wide Web ("the Web") which is an interface protocol for the Internet which allows communication between diverse computer platforms through a graphical interface. Computers communicating over the Web are able to download and execute small applications called applets. Given that applets may be executed on a diverse assortment of computer platforms, the applets are typically executed by a Java™ virtual machine.

Recently, the Java™ programming environment has become quite popular. The Java™ programming language is a language that is designed to be portable enough to be executed on a wide range of computers ranging from small devices (e.g., pagers, cell phones and smart cards) up to supercomputers. Computer programs written in the Java™ programming language (and other languages) may be compiled into Java™ Bytecode instructions that are suitable for execution by a Java™ virtual machine implementation. The Java™ virtual machine is commonly implemented in software by means of an interpreter for the Java™ virtual machine instruction set but, in general, may be software, hardware, or both. A particular Java™ virtual machine implementation and corresponding support libraries together constitute a Java™ runtime environment.

Computer programs in the Java™ programming language are arranged in one or more classes or interfaces (referred to herein jointly as classes or class files). Such programs are generally platform, i.e., hardware and operating system, independent. As such, these computer programs may be executed without modification on any computer that is able to run an implementation of the Java™ runtime environment.

Object-oriented classes written in the Java™ programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java™ virtual machine) is described in some detail in *The Java Virtual Machine Specification, Second Edition*, by Tim Lindholm and Frank Yellin, which is hereby incorporated herein by reference.

FIG. 1A shows a progression of a simple piece of a Java™ source code 101 through execution by an interpreter, the Java™ virtual machine. The Java™ source code 101 includes the classic Hello World program written in Java™. The source code is then input into a Bytecode compiler 103 that compiles the source code into Bytecodes. The Bytecodes are virtual machine instructions as they will be executed by a software emulated computer. Typically, virtual machine instructions are generic (i.e., not designed for any specific microprocessor or computer architecture) but this is not required. The Bytecode compiler outputs a Java™ class file 105 that includes the Bytecodes for the Java™ program. The Java™ class file is input into a Java™ virtual machine 107. The Java™ virtual machine is an interpreter that decodes and executes the Bytecodes in the Java™ class file. The Java™ virtual machine is an interpreter, but is commonly referred to as a virtual machine as it emulates a microprocessor or computer architecture in software (e.g., the microprocessor or computer architecture may not exist in hardware).

FIG. 1B illustrates a simplified class file 100. As shown in FIG. 1B, the class file 100 includes a constant pool 102 portion, interfaces portion 104, fields portion 106, methods portion 108, and attributes portion 110. The attributes (or attributes table) 110 portion represents the attributes associated with the class file 100. This allows for one or more attributes to be defined, each of which can be associated with one or more components of the class file. As is known to those skilled in the art, the Java™ virtual machine implementations are allowed to define and use various attributes. In addition, the virtual machine's implementations ignore attributes that they do not recognize. Thus, a class file may contain one or more attributes, all or none of which may be recognized by a particular virtual machine implementation.

Conventionally, Java™ objects are represented in memory so that the methods associated with the objects can be referenced from the object representation. Typically, there is a reference from the Java™ object representation directly to a method table that includes the methods associated with the object. Although the direct reference to the method table allows, method invocations to be performed, the conventional object representation in Java™ requires some processing to find information about the object (e.g., object type, object size, static fields, etc.) Such information about the Java™ object can be stored in the internal class representation of the object. In other words, the virtual machine typically internally represents and stores the information associated with the Java™ object's class. However, accessing this information takes up valuable processing time. This can seriously hinder performance of virtual machines, especially in systems with limited computing power and/or memory.

In view of the foregoing, improved techniques for representation of objects in Java™ programming environments are needed.

SUMMARY OF THE INVENTION

Broadly speaking, the present invention relates to techniques for representation of objects in a Java™ programming environment. The techniques are highly suitable for representation of Java™ objects inside virtual machines, especially those that operate with limited resources (e.g., embedded systems). In accordance with one aspect of the invention, a Java™ object representation is disclosed. As will be appreciated, the Java™ object representation provides a reference that can be used to directly access the internal class representation associated with the object. The internal class representation provides information regarding the Java™ object (e.g., object size, object type, static fields, etc.) As a result, the invention allows quick access to information regarding Java™ objects. This means that the processing time conventionally needed to access information regarding Java™ objects is reduced. Thus, the invention can enhance performance of virtual machines, especially in systems with limited computing power and/or memory.

The invention can be implemented in numerous ways, including as a method, an apparatus, a computer readable medium, and a database system. Several embodiments of the invention are discussed below.

As a Java™ object representation suitable for use by a Java™ virtual machine, one embodiment of the invention includes a first reference to an internal class representation of the Java™ object, a second reference to instance fields associated with the Java™ object. The first reference is a direct reference to the internal class representation of the Java™ object.

As a method for representing a Java™ object in a virtual machine, one embodiment of the invention includes the acts of: allocating a first reference in a memory portion of the virtual machine, wherein the first reference is a reference to an internal class representation of the Java™ object; and allocating a second reference in a memory portion of the virtual machine, wherein the second reference is a reference to instance fields associated with the Java™ object; and wherein the first reference is a direct reference to the internal class representation of the Java™ object.

As a method of accessing information regarding a Java™ object, one embodiment of the invention includes the acts of identifying an object representation associated with the Java™ object; using a first reference in the object representation to locate an appropriate internal class representation associated with the Java™ object; accessing information regarding the Java™ object from the internal class representation; and wherein the object is represented in a Java™ virtual machine.

As a computer readable media including computer program code for a Java™ object representation suitable for use by a Java™ virtual machine, one embodiment of the invention includes computer program code for a first reference to an internal class representation of the Java™ object; computer program code for a second reference to instance fields associated with the Java™ object. The first reference is a direct reference to the internal class representation of the Java™ object.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As noted in the background, typically, the virtual machines internally represent and store the information associated with the Java™ object's class. However, accessing this information using conventional techniques takes up valuable processing time. This can seriously hinder performance of virtual machines, especially in systems with limited computing power and/or memory.

The present invention pertains to techniques for representation of objects in a Java™ programming environment. The techniques are highly suitable for representation of Java™ objects inside virtual machines, especially those that operate with limited resources (e.g., embedded systems). In accordance with one aspect of the invention, a Java™ object representation is disclosed. As will be appreciated, the Java™ object representation provides a reference that can be used to directly access the internal class representation associated with the object. The internal class representation provides information regarding the Java™ object (e.g., object size, object type, static fields, etc.) As a result, the invention allows quick access to information regarding Java™ objects. This means that the processing time conventionally needed to access information regarding Java™ objects is reduced. Thus, the invention can enhance performance of virtual machines, especially in systems with limited computing power and/or memory.

Embodiments of the invention are discussed below with reference to FIGS. 2–4. However, those skilled in the art will readily appreciate that the detailed description given herein with respect to these figures is for explanatory purposes only as the invention extends beyond these limited embodiments.

Figure 1A:
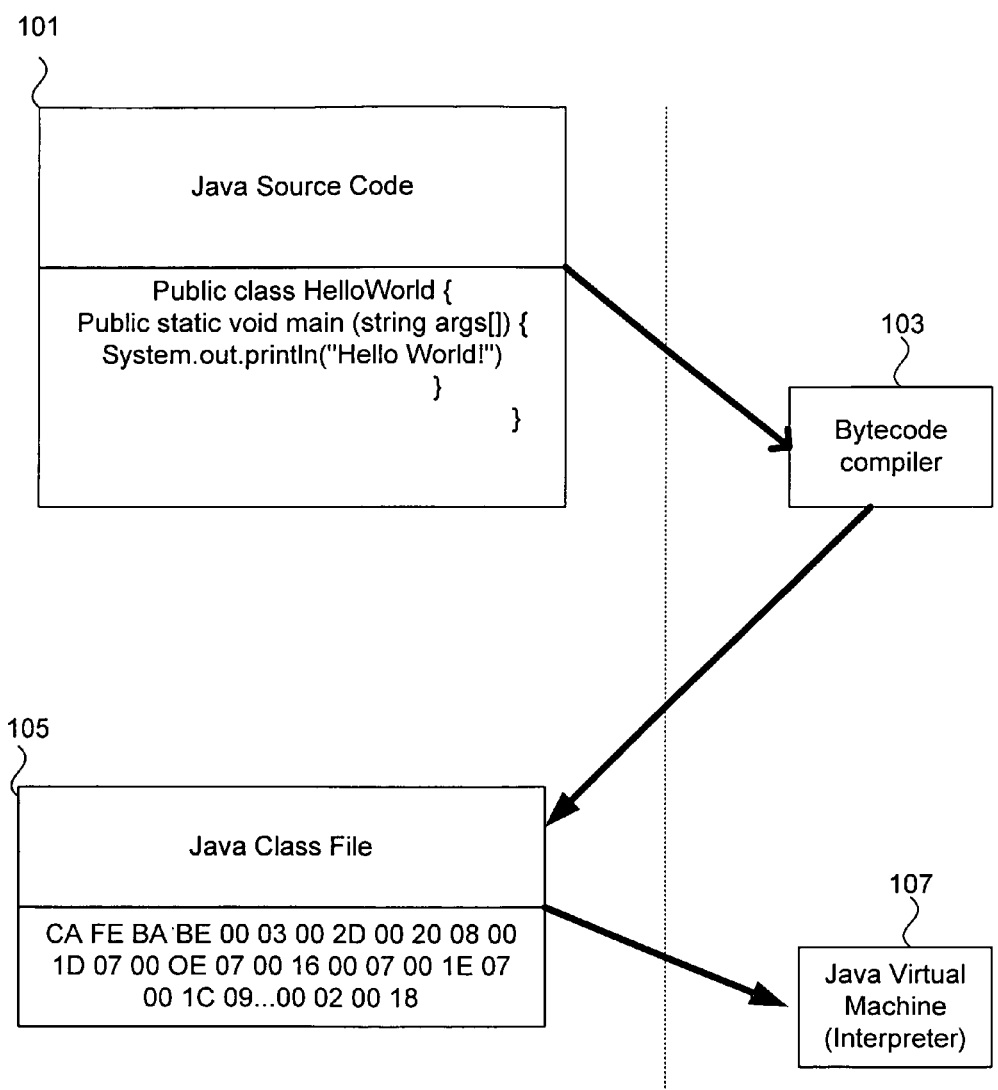
FIG. 1A shows a progression of a simple piece of a Java™ source code through execution by an interpreter, the Java™ virtual machine.
Figure 1B:
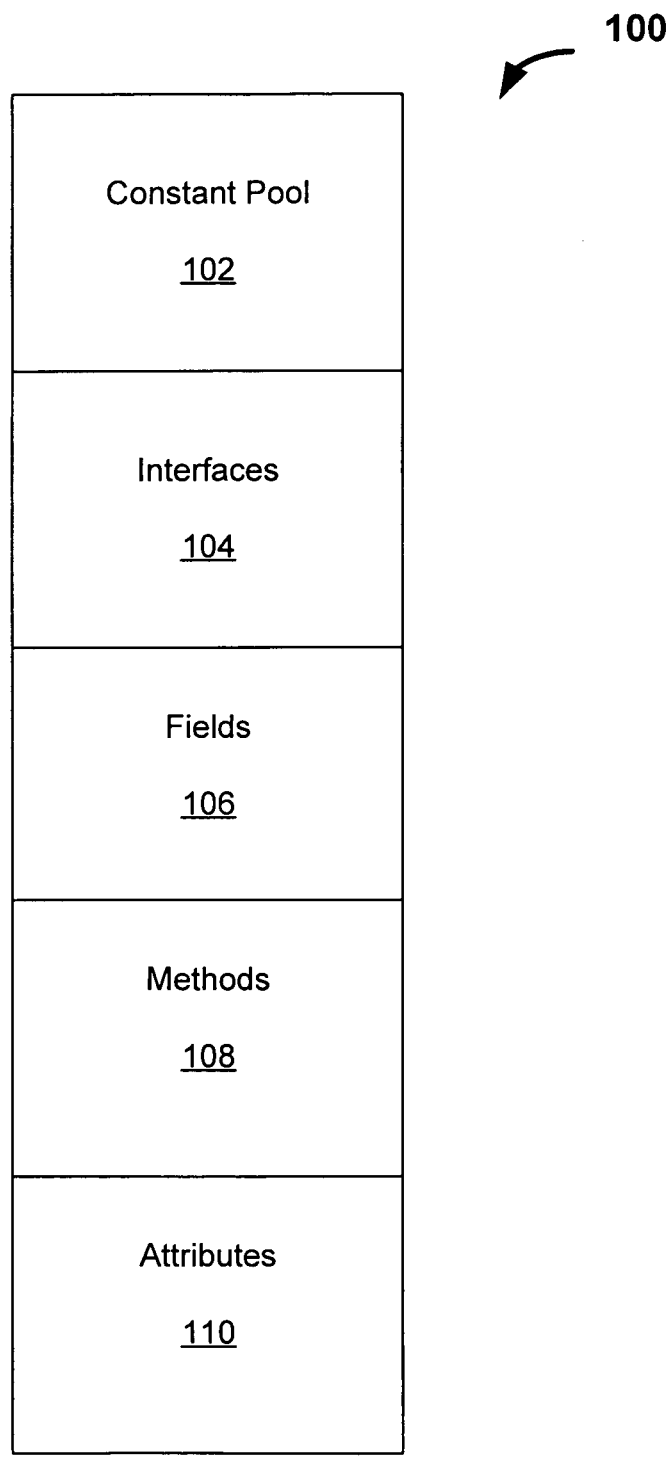
FIG. 1B illustrates a simplified class file.
Figure 2:
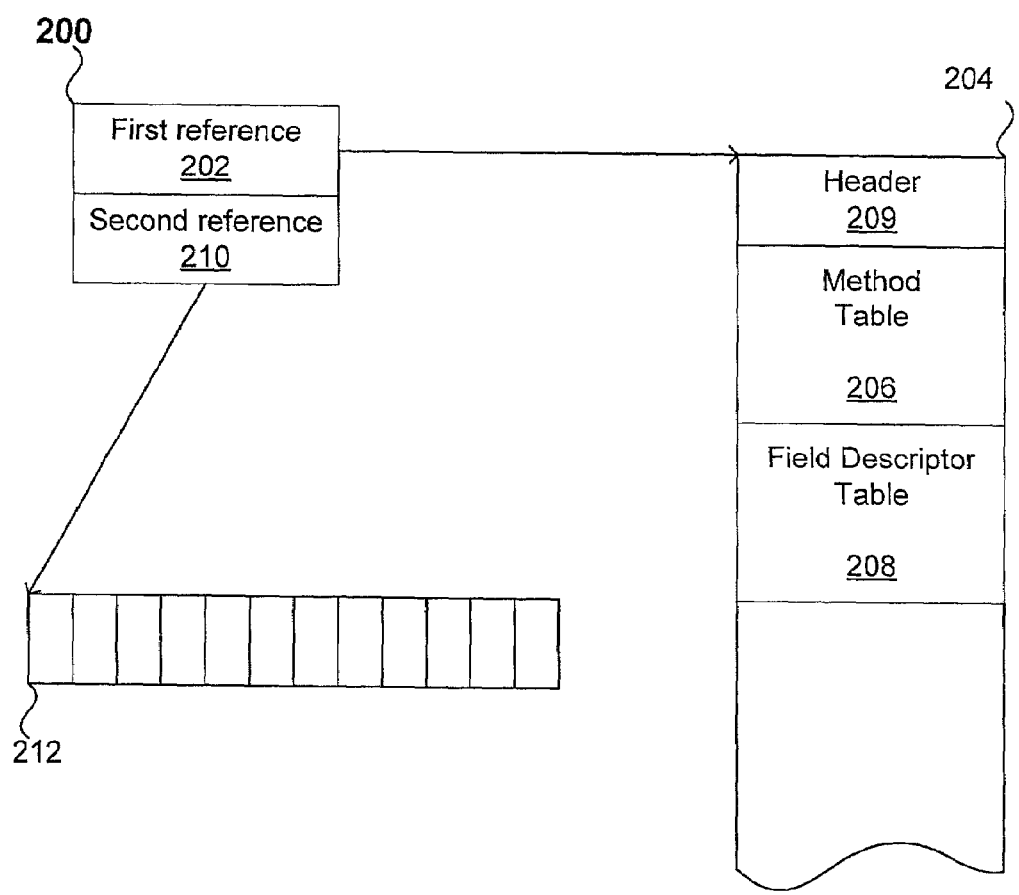
FIG. 2 represents a Java™ computing environment including a Java™ object representation in accordance with one embodiment of the invention.

FIG. 2 represents a Java™ computing environment including a Java™ object representation 200 in accordance with one embodiment of the invention. The object representation 200 is suitable for representation of a Java™ object in a virtual machine. As shown in FIG. 2, the object representation 200 includes a first reference 202 to an internal class representation 204. The internal class representation 204 provides information regarding the Java™ object. This information can include, for example, a method table 206 and a field descriptor table 208, as well as other information relating to the Java™ object. In the described embodiment, the method table 210 immediately follows a header 209 which is of a predetermined size.

As will be appreciated, the first reference 202 can be used to directly access the internal class representation 204 so that information regarding the Java™ object can be accessed quickly. As a result, information regarding objects can be accessed more quickly than conventional techniques which require more processing to find this information.

In addition, the object representation 200 includes a second reference 210 to instance fields associated with the Java™ object. These instance fields can be unique for each object and can, for example, include instance variables associated with the Java™ object. Instance fields in the context of the Java™ programming language are well known to those skilled in the art.

It should be noted that the internal object representation 200 may include an identifier that uniquely identifies the Java™ object. As will be appreciated by those skilled in the art, the identifier can be a hash key. In one embodiment, the address of the first reference 202 is used as the hash key. It should also be noted that the first and second references 202 and 210 represent two consecutive memory addresses. As such, each of the first and second references 202 and 210 can be four consecutive bytes (one word) in a memory portion of the virtual machine.

Figure 3:
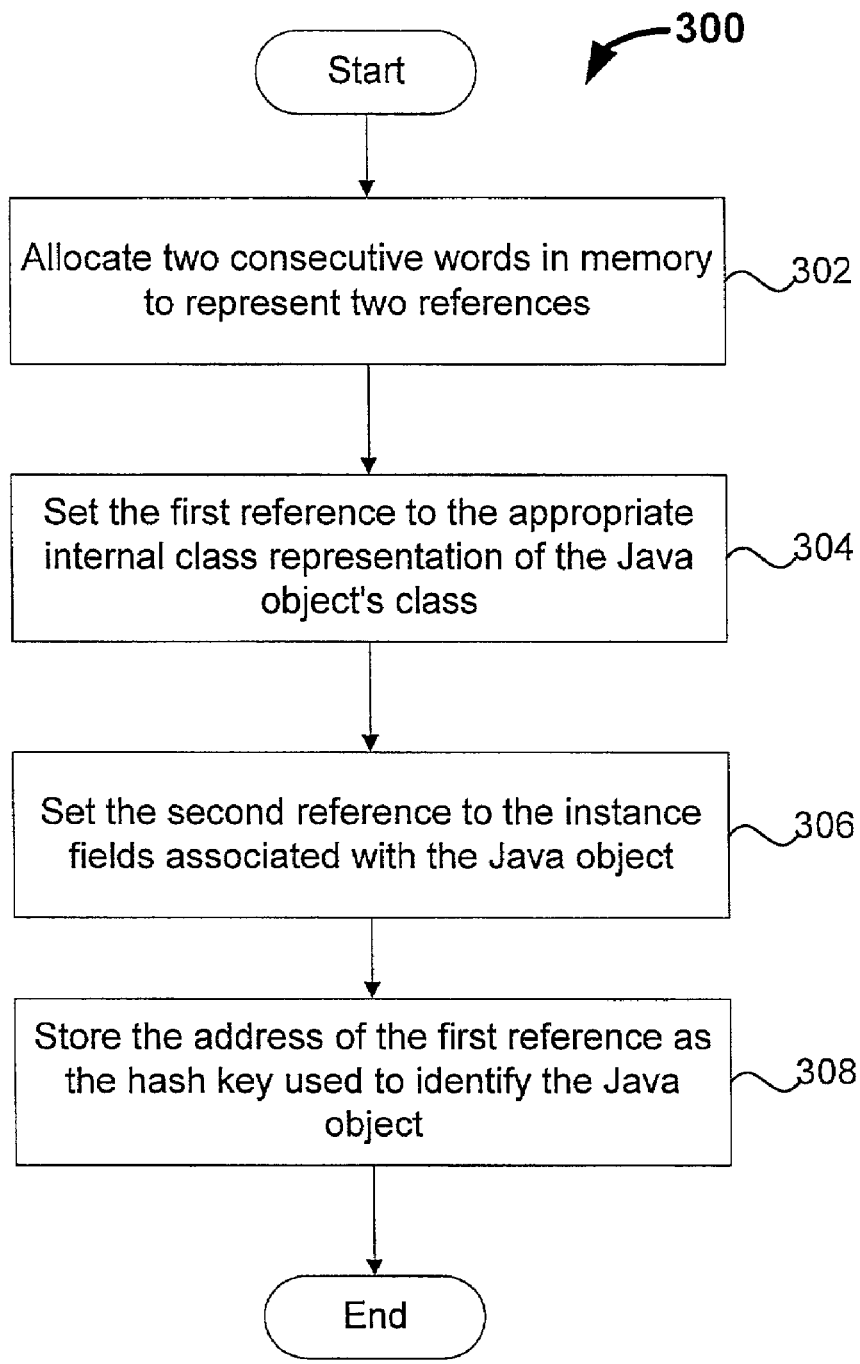
FIG. 3 illustrates a method for representing Java™ objects in a Java™ computing environment.

FIG. 3 illustrates a method 300 for representing Java™ objects in a Java™ computing environment. Method 300 can be used by a Java™ virtual machine to represent Java™ objects. Initially, at operation 302, two consecutive words is allocated in memory. Four consecutive bytes can be allocated for each word which can be used to represent a reference (e.g., a pointer to another memory location). Next, at operation 304, the first reference (i.e., first word) is set to the location of an internal class representation for the class which the Java™ object belongs to. Thereafter, at operation 306, the second reference is set to the location of the instance fields associated with the Java™ object. Finally, at operation 308, the address of the first reference is stored. As will be appreciated, this address can be used as a hash key to identify and/or locate the representation of the Java™ object.

Figure 4:
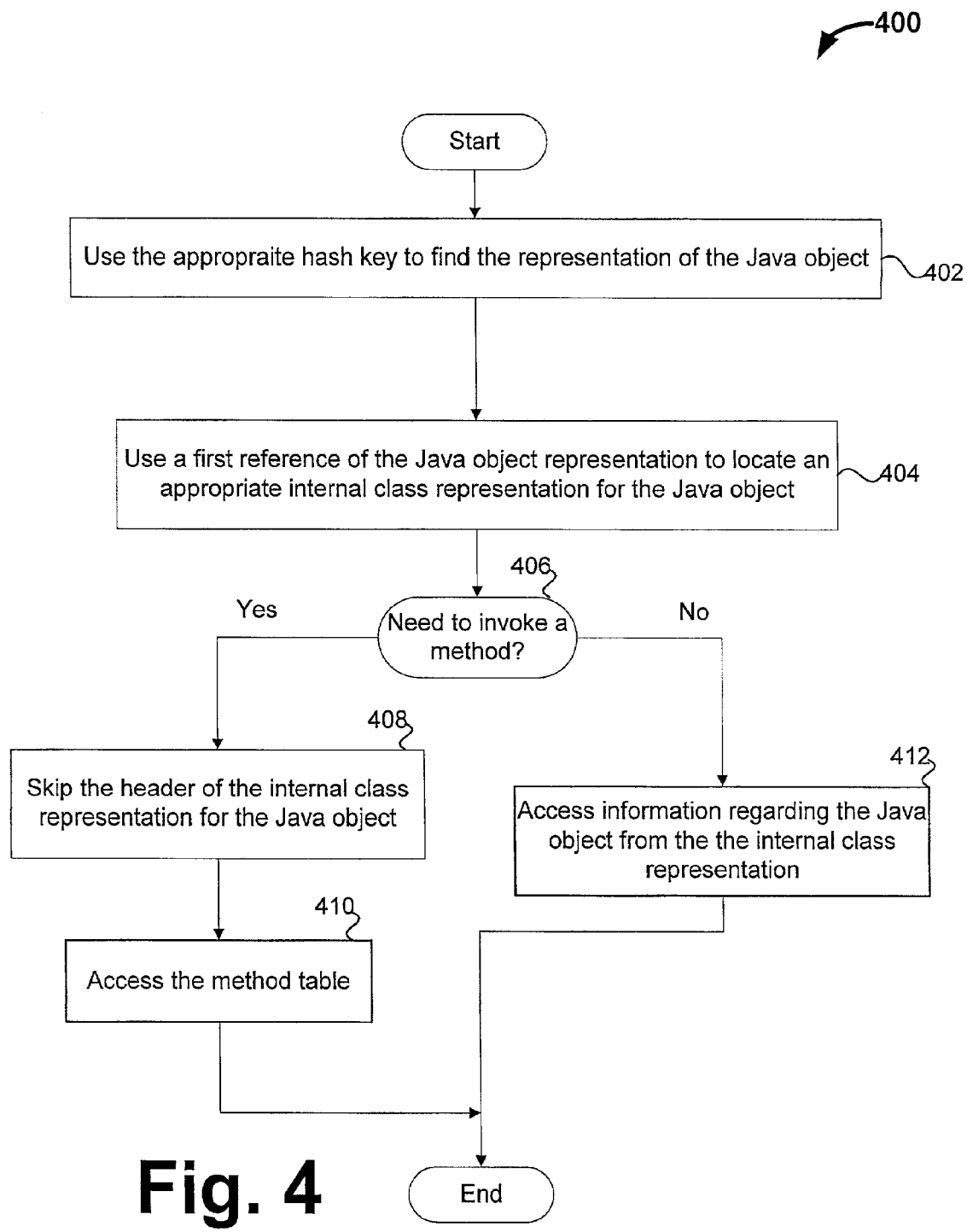
FIG. 4 illustrates a method for accessing information regarding a Java™ object using an object representation, in accordance with one embodiment of the invention.

FIG. 4 illustrates a method 400 for accessing information regarding a Java™ object using an object representation, in accordance with one embodiment of the invention. The method 400 can be used by a virtual machine to access information regarding the Java™ object. Initially, at operation 402, the appropriate hash key is used to locate the representation of the Java™ object. Next, at operation 404, the first reference of the Java™ object representation is used to locate the appropriate internal class representation for the Java™ object. Thereafter, at operation 406, a determination is made as to whether a method associated with the object needs to be invoked. If it is determined at operation 406 that a method associated with the object needs to be invoked, the method 400 proceeds to operation 408 where the header associated with the internal class representation is skipped. Accordingly, the method table that follows the header is accessed at operation 410 to invoke the appropriate method. The method 400 ends following operation 410. However, if it is determined at operation 406 that a method associated with the object does not need to be invoked, the method 400 proceeds to operation 412 where the information regarding the Java™ object can be accessed from appropriate entries in the internal class representation.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer readable medium stored in a computer system including computer program code for representing an object of an object-based programming environment as an object representation inside a virtual machine, wherein said object representation is suitable for use by said virtual machine, said object representation comprising a first reference, a second reference, and a hash key, and said computer readable medium comprising:

computer program code for allocating said first reference to an internal class representation inside said virtual machine, wherein said internal class representation is a representation inside said virtual machine for a class (or class file) of said object of said object-based programming environment, wherein said internal class representation describes one or more methods associated with said object and wherein said first reference is used to invoke said one or more methods;

computer program code for allocating said second reference to instance fields of said object which is represented by said object representation inside said virtual machine, wherein said second reference is used to access one or more instance fields of said object at runtime;

computer program code for storing a hash key that is used to identify the object, wherein said hash key is the memory address of said first reference;

wherein said second reference is a reference to an array of references that references each of said instance fields of said object, wherein each reference in said array of references is a reference to an instance field of said object, and wherein each of said instance fields is accessed by indexing said array of references; and wherein said internal class representation includes a header of a predetermined size, and wherein a method table associated with said object is allocated immediately after said header.

2. A method for representing an object of an object-based programming environment in a virtual machine as an object representation that comprises a first and a second reference, said method comprising:

allocating said first reference in a memory portion of said virtual machine, wherein said first reference is a reference to an internal class representation of said object, wherein said internal class representation is a representation inside said virtual machine of a class (or class file) associated with said object of said object-based programming environment, wherein said internal class representation includes a method table that describes one or more methods associated with said object, wherein said first reference is a direct reference to said internal class representation, and wherein said first reference is used to invoke said one or more methods;

allocating said second reference in a memory portion of said virtual machine, wherein said second reference is a reference to instance fields of said object, and wherein said second reference is used to access one or more instance fields of said object at runtime, wherein said second reference is a reference to an array of references that references each of said instance fields of said object, wherein each reference in said array of references is a reference to an instance field associated with said object, and wherein each of said instance fields is accessed by indexing said array of references.

3. A method as recited in claim 2, wherein said first reference is allocated as four bytes.

4. A method as recited in claim 2, wherein said second reference is allocated as four bytes.

5. A method as recited in claim 2, wherein said internal class representation includes a header of a predetermined size, and wherein a method table associated with said object is allocated immediately after said header.

6. A method as recited in claim 2, wherein object representation further comprises:

storing a hash key that represents the object.

7. A method as recited in claim 2, wherein said hash key is the memory address of said first reference.

8. A method of accessing information associated with an object of an object-based programming environment which has been represented in an internal object representation inside a virtual machine, said method comprising:

identifying an internal object representation for said object inside said virtual machine, wherein said internal object representation includes a first reference and a second reference;

determining whether to invoke a method associated with said object or access an instance field associated with said object;

using said first reference in said internal object representation to locate an appropriate internal class representation inside said virtual machine when said determining determines to invoke said method, wherein said internal class representation is a representation inside said virtual machine of a class (or class file) associated with said object of said object-based computing environment, and wherein said internal class representation includes a method table which is used to invoke one or more methods associated with said object; and using said second reference in said internal object representation to locate one or more instance fields of said object when said determining determines to access said instance field, wherein said second reference is used to directly access said one or more instance fields of said object, wherein said second reference is a reference to an array of references that references each of said instance fields of said object, wherein each reference In said array of references is a reference to an instance field associated with said object, and wherein each of said instance fields is accessed by indexing said array of references.

9. A method as recited in claim 8, wherein said method further comprises:

wherein said internal class representation includes a header of a predetermined size;

wherein a method table associated with said object is allocated immediately after said header; and skipping said header of said internal class representation to access a method table associated with said object.

10. A method as recited in claim 8, wherein said information regarding said object further includes a field descriptor table.

11. An apparatus, comprising: at least one processor which can receives computer program code for a virtual machine, wherein said virtual machine is capable of:

identifying an internal object representation for an object of an object-based programming environment inside said virtual machine, wherein sad internal object representation includes a first reference and a second reference;

determining whether to invoke a method associated with said object or access an instance field associated with said object;

using said first reference in said internal object representation to locate an appropriate internal class representation inside said virtual machine when said determining determines to invoke said method, wherein said internal class representation is a representation inside said virtual machine of a class (or class file) associated with said object of said object-based programming environment, and wherein said internal class representation includes a method table which is used to locate one or more methods associated with said object; and using said second reference in said internal object representation to locate one or more instance fields of said object when said determining determines to access said instance field, wherein said second reference is used to directly access said one or more instance fields of said object, wherein said second reference is a reference to an array of references that references each of said instance fields of said object, and wherein each of said instance fields is accessed by indexing said array of references.

12. A virtual machine as recited in claim 11, wherein said internal class representation includes a header of a predetermined size, and wherein a method table associated with said object is allocated immediately after said header.

* * * * *

UNITED STATES PATENT AND TRADEMARK OFFICE
CERTIFICATE OF CORRECTION

PATENT NO. : 7,082,597 B2 Page 1 of 1
APPLICATION NO. : 09/886454
DATED : July 25, 2006
INVENTOR(S) : Sokolov et al.

It is certified that error appears in the above-identified patent and that said Letters Patent is hereby corrected as shown below:

In line 2 of claim 11 (column 8, line 2) delete "can" before "recieves".

Signed and Sealed this

Seventh Day of November, 2006

JON W. DUDAS
*Director of the United States Patent and Trademark Office*